United States Patent [19]
Schofield

[11] Patent Number: 5,472,613
[45] Date of Patent: Dec. 5, 1995

[54] REMOVING VOLATILE AND NON-VOLATILE ORGANIC IN A THICK FILM EQUILIBRIUM PROCESS AND DEVICE

[75] Inventor: Richard W. Schofield, Monroe, Oreg.

[73] Assignee: EnviroSep Inc., Monroe, Oreg.

[21] Appl. No.: 228,562

[22] Filed: Apr. 15, 1994

Related U.S. Application Data

[63] Continuation-in-part of Ser. No. 49,169, Apr. 19, 1993, abandoned.
[51] Int. Cl.$^6$ .................................................. B01D 11/00
[52] U.S. Cl. .................. 210/634; 210/644; 210/649; 210/500.23; 210/321.88; 210/321.89; 210/321.83; 210/321.75; 95/45; 95/50; 95/93; 95/116; 96/144; 96/154
[58] Field of Search .......................... 210/640, 500.23, 210/650, 653, 654, 321.88, 321.89, 490, 634, 644, 649, 175, 180, 321.83, 321.75; 95/50, 95, 45, 116, 93, 114; 96/154, 143, 144

[56] References Cited

U.S. PATENT DOCUMENTS

| | | | |
|---|---|---|---|
| 2,642,153 | 6/1953 | Parks | 95/116 |
| 4,238,204 | 12/1980 | Derry | 95/45 |
| 4,713,089 | 12/1987 | Robbins | 203/24 |
| 4,925,459 | 5/1990 | Rusey et al. | 210/154 |
| 4,960,520 | 10/1990 | Semmens | 210/640 |
| 5,104,425 | 4/1992 | Rao et al. | 95/45 |
| 5,169,533 | 12/1992 | Baker et al. | 210/640 |

FOREIGN PATENT DOCUMENTS

| | | | |
|---|---|---|---|
| 324675 | 7/1989 | European Pat. Off. | 95/50 |
| 3726431 | 2/1989 | Germany | 95/50 |
| 2225207 | 10/1987 | Japan | 210/640 |
| 2273009 | 11/1987 | Japan | 210/640 |
| WO90/11119 | 10/1990 | WIPO | 210/640 |

OTHER PUBLICATIONS

Schofield, "Opportunities for Pervaporation in Treating VOC–Contaminated Water" *Decision Resources* Oct. 1, 1991.
Robeson and Langsam, "Poly (Trimethylsilylpropyne) Utility as a Polymeric Absorbent for Removal of Trace Organics from Air and Water Sources" *Separation Sci. and Tech.* 27:1245, 1992.

(List continued on next page.)

*Primary Examiner*—Robert A. Dawson
*Assistant Examiner*—Ana M. Fortuna
*Attorney, Agent, or Firm*—Jeffrey B. Oster

[57] ABSTRACT

There is disclosed a method for removing a volatile component from a feed or process stream comprising (1) absorbing or adsorbing the volatile component into an absorbent or adsorbent material in an equilibrium process, wherein feed is pumped through a mixture chamber of a device, wherein the device comprises the mixture chamber and a vapor chamber, wherein the mixture chamber comprises a plurality of films comprising absorbent or adsorbent materials, wherein the film is configured to have a first side communicating with the mixture chamber and a second side communicating with the vapor chamber, and (2) removing the volatile component from the absorbent or adsorbent material by applying heat to the mixture chamber and simultaneously applying a gas phase within the vapor chamber such that the volatile component is collected in a gaseous state in the vapor chamber. There is further disclosed a device for removing a volatile component from a feed comprising an enclosed two-chambered device having a mixture chamber and a vapor chamber, wherein the mixture chamber comprises a plurality of absorbent or adsorbent materials configured to have a first side communicating with the mixture chamber and a second side communicating with the vapor chamber, wherein the absorbent or adsorbent materials comprise a thick film having a thickness of from about 0.1 mm to about 5 mm thick with optional protuberances.

16 Claims, 10 Drawing Sheets

(a) Section of Tube Bundle in Exemplary Device (b) Schematic of Exemplary Device

OTHER PUBLICATIONS

Hino et al., "Removal of Halogenated Organics from their Aqueous Solutions by Pervaporation" *Proceedings of Fifth Int. Conf. on Pervaporation Processes in Chemical Industry* Heidelberg, Germany 423, Mar. 11–15, 1991.

Shah and Bartels, "Engineering Considerations in Pervaporation Applications" *Proceedings of Fifth Int. Conf. on Pervaporation Processes in Chemical Industry* Heidelberg, Germany 331, Mar. 11–15, 1991.

Gooding et al., "Mass Transfer Characteristics of a New Pervaporation Module for Water Purification" *Proceedings of Fifth Int. Conf. on Pervaporation Processes in Chemical Industry Heidelberg, Germany 237, Mar. 11–15, 1991.*

(a) Section of Tube Bundle in Exemplary Device (b) Schematic of Exemplary Device Second Part of Cycle Third Part of Cycle Extruded Absorbent Cross-Section Feed During Loading Air During Regeneration Clean Water During Loading Concentrated Vapor During Regeneration Heating Chamber

REMOVING VOLATILE AND NON-VOLATILE ORGANIC IN A THICK FILM EQUILIBRIUM PROCESS AND DEVICE

CROSS REFERENCE TO RELATED APPLICATION

This patent application is a continuation-in-part of U.S. patent application Ser. No. 08/049,169 filed Apr. 19, 1993, now abandoned.

TECHNICAL FIELD OF THE INVENTION

The present invention provides a process and a device for selectively removing and concentrating a volatile component that is present in a dilute form in a feed stream (liquid or gas) with a minimum of energy use.

BACKGROUND OF THE INVENTION

Many waste waters, ground waters and process streams contain low solubility, volatile, organic contaminants, such as halogenated hydrocarbons and aromatic compounds. In the United States, about 9 billions kilograms of chemicals are accidentally or purposefully discharged into surface waters, underground wells and waste water treatment plants each year. Of this amount, about 2 billion kilograms are organic solvents. More than 50% of these solvents (about 1 billion kilograms) are discharged into aqueous streams at a concentration of less than 1%. Accordingly, there is a significant need to develop and improve separation processes and devices to be used to remove dilute organic solvents from aqueous waste streams.

Separation processes generally require preferential transfer of a component from a first phase, where the component is present in dilute form, to a second phase, where the component is present in a much more concentrated form. Separation processes are either an equilibrium process or a rate process. In an equilibrium process, a component in the first phase will distribute between two or more phases until satisfying an equilibrium condition (zero net interchange of components between the phases). Separation of a component between phases only occurs when there is an uneven distribution between phases. Absorption, for example, is an equilibrium process. In contrast, a rate process performs a separation based upon the rates at which a component moves from one phase into another phase. A rate process is a continuous process because the system is not allowed to come to equilibrium. Membrane pervaporation is a rate process.

There have been several techniques developed to address the need to remove volatile organic contaminants (VOCs) from aqueous streams. However, there are many disadvantages associated with such processes, including, for example, high energy costs, inability to conduct the process on a large scale, air emissions of organic vapor to transfer a water pollution problem into an air pollution problem, inability to recover the VOCs, and the problem of solid waste disposal of solid material containing the absorbed or adsorbed organic component.

One process that has been developed is a sorption process, which is an equilibrium process. In sorption (be it adsorption or absorption), the component in a first phase is attached to or is dissolved in sorbent material. The component is removed from the first phase until the sorbent material approaches equilibrium. The sorbent material is then removed and is either discarded (now creating a solid waste problem in the process of solving a liquid waste problem) or, if it is a solid such as carbon, is regenerated by adding copious amounts of heat or steam. Also, spent carbon must be incinerated to destroy adsorbed organic materials, because disposal of the carbon as solid waste may be considered as hazardous waste.

Membrane pervaporation is a rate separation process that utilizes thin membranes to separate components in a feed stream. Both volatile components and water permeate across the thin membrane. The rates at which volatile components in the feed stream and water permeate through a membrane (having a first side and a second side) must be in a different ratio to the concentration of the components in the feed stream in order for separation to occur. Pervaporation often requires that the entire waste water stream be heated to 60° C. to 80° C. in order to provide a high driving force for VOCs to pass through the membrane. This is an energy intensive process. The VOCs dissolve within the membrane matrix, and diffuse across the membrane to form a vaporous permeate stream on the second side of the membrane. The driving force for this diffusion is heating of the feed stream and applying a vacuum to the permeate stream.

Another technique is solvent extraction. This technique introduces another organic phase (the extractant) into the contaminated water that is immiscible with water but that can dissolve organic contaminants. The water and the extractant are mixed and then separated with the contaminants in the extractant. This process, however, utilizes a high volume of organic solvents. This can create disposal problems and requires further separation of the contaminant from the extractant.

Another technique that was in common use is air stripping. Air stripping removes VOCs from an aqueous phase and transfer them to air. Previously, the air was released into the atmosphere, making this procedure relatively inexpensive. Now, however, the air must be purified by activated carbon, or other techniques, making this procedure more expensive.

Steam stripping heats the entire waste water stream to boiling and volatile organic components are evaporated. Even with energy recovery, this process is very energy intensive.

Some contaminants can be removed by oxidation catalysis or UV ozonation. UV ozonation destroys the volatile organic contaminants by oxidation in the presence of UV light. This prevents recovery of the organics for reuse. Also UV irradiation can be harmful and dangerous (i.e., mutagenic).

U.S. Pat. No. 4,960,520 describes an absorption process to remove volatile organic contaminants from an aqueous solution. Contaminated water is pumped through hollow fiber membranes of microporous polypropylene having a very thin outer coating of plasma polymerized disiloxane (a silicone rubber). The hollow fibers are potted in a module resembling a shell and tube heat exchanger and strippant (oil) is pumped through the module shell. VOCs in the water diffuse across the membrane and dissolve into the oil. This process can remove contaminants. However, this process does not result in much VOC concentration and it cannot recycle the contaminants because the contaminants are now in an oil solution. In this configuration and process, it is necessary to have the membrane be as thin as possible to function only to separate the oil phase from the aqueous phase but allow contaminants to pass through as quickly as possible. One problem with this procedure and configuration is that oil can pass backwards through the membrane into the aqueous stream and contaminate it.

A similar method and apparatus is described in U.S. Pat. No. 4,915,838 for gaseous feed streams contaminated with organic vapors. Organic vapors are removed from ambient atmosphere by a thin microporous membrane medium together with a non-volatile collecting fluid having an affinity for the gaseous contaminant. Here, the membrane acts to stabilize the interface between the collecting fluid and air. The membrane is non-selective and acts to provide a large surface area for contact between air and the collecting fluid.

There are also often fouling problems associated with separating volatile components from feed streams. Depending upon the nature of the separation, fouling can be biological, mineral or organic. Biological fouling occurs when there is microbial contamination of an aqueous medium that creates a slime to foul the separating device. Mineral fouling is a problem in water treatment equipment when mineral deposits can foul surfaces and effect mass transfer. Organic fouling from non-volatile, low solubility organic substances can occur and interfere with equilibrium or membrane processes.

Another problem sometimes encountered in environmental remediation systems is that the ground water is contaminated by both volatile contaminants and non-volatile organic contaminants. Irrespective of energy used, both sorption and pervaporation processes cannot remove the non-volatile contaminants effectively without creating a solid waste disposal problem. Accordingly, there is a need to design better systems to remove multiple contaminants.

Still further, there is often contamination of aqueous feed streams with non-volatile contaminants (e.g., dioxin) without the presence of a contaminating volatile component. Even if the dioxin is removed, disposal is often as a hazardous solid waste, which can simply transfer the problem to another site. Therefore, there is a need to be able to remove non-volatile contaminants in a form so that they can be destroyed, such as by incineration.

Therefore, there is a need in the art to provide an energy efficient process for removing volatile components from feed streams. There are many applications where a volatile component must be separated from a non-aqueous solution. Further, there are many examples where water must be separated from organic solvents (i.e., when water is a dilute volatile component). Such applications and many similar applications require an energy-efficient method and device for removing and recovering dilute volatile components. The invention was made to address this need.

SUMMARY OF THE INVENTION

The present invention provides a thick film equilibrium device and a process for removing volatile contaminants (e.g., VOCs) from a feed stream with a minimum of energy and as thoroughly as possible. The inventive method for removing a volatile component from a feed (i.e., a fluid mixture or a gaseous mixture) comprises (1) absorbing or adsorbing the volatile component into an absorbent or adsorbent material in an equilibrium process, wherein feed is pumped through a mixture chamber of a device, wherein the device comprises a mixture chamber and a vapor chamber, wherein the mixture chamber comprises a plurality of absorbent or adsorbent materials configured to have a first side communicating with the mixture chamber and a second side communicating with the vapor chamber, and (2) removing the volatile component from the absorbent or adsorbent material in a regeneration step by applying heat to the mixture chamber and simultaneously applying a gas phase or vacuum within the vapor chamber such that the volatile component is collected in the vapor state in the vapor chamber. Preferably, the method further comprises the step of condensing the volatile component vapor into a liquid and collecting the volatile component in a liquid form. During regeneration, latent heat is supplied to the mixture chamber, preferably in the form of a warm or hot fluid having a temperature of from about 30° C. to about 150° C., and most preferably from about 60° C. to about 100° C.

The present invention provides a device for removing a volatile component from a feed comprising an enclosed two-chambered device having a mixture chamber and a vapor chamber, wherein the mixture chamber comprises a plurality of absorbent or adsorbent materials configured to have a first side communicating with the mixture chamber and a second side communicating with the vapor chamber, wherein the absorbent or adsorbent materials comprise a thick film having a thickness of from about 0.1 mm to about 5 mm thick. Preferably, the device further comprises a condensing means communicating with the vapor chamber to condense a gas phase of a volatile component into a liquid phase. The absorbent or adsorbent film may be configured as the walls of a tubular array (straight or tortuous), as a sheet (flat or curved), or as a tube or sheet having a plurality of protuberances. The absorbent material is composed of any solid material, such as a polymeric material, that absorbs the volatile component. The adsorbent material is composed of any solid material such as a porous material, that adsorbs the volatile component. Further, there may be a combination of adsorbent and absorbent materials to both adsorb and absorb the volatile component.

The present invention further provides a process for removing a volatile gaseous component from a gaseous mixture (feed) comprising (1) absorbing or adsorbing the volatile component into an absorbent or adsorbent material in an equilibrium process, wherein feed is pumped through a mixture chamber of a device, wherein the device comprises the mixture chamber and a vapor chamber, wherein the mixture chamber comprises a plurality of absorbent or adsorbent materials configured to have a first side communicating with the mixture chamber and a second side communicating with the vapor chamber, and (2) removing the volatile component from the absorbent or adsorbent material in a regeneration step by applying heat to the mixture chamber and simultaneously applying a gas phase or vacuum within the vapor chamber such that the volatile component is collected in a gaseous state in the vapor chamber.

The present invention further provides a process for removing a non-volatile organic component from an aqueous feed comprising (1) absorbing or adsorbing the non-volatile organic component into an absorbent or adsorbent material in an equilibrium process, wherein feed is pumped through a mixture chamber of a device, wherein the device comprises the mixture chamber and a vapor chamber, wherein the mixture chamber comprises a plurality of absorbent or adsorbent materials configured to have a first side communicating with the mixture chamber and a second side communicating with the vapor chamber, (2) filling the vapor chamber with a volatile liquid organic solvent and collecting the non-volatile component into the liquid solvent, and (3) removing the liquid solvent from the vapor chamber. Preferably, the inventive process for removing a non-volatile organic component from an aqueous feed further comprises removing any residual volatile liquid solvent from the absorbent or adsorbent material by applying heat to the mixture chamber and simultaneously applying a gas phase or vacuum within the vapor chamber to collect the volatile liquid as a vapor in the vapor chamber. When an aqueous feed stream contaminated with a volatile contaminant contains traces of a non-volatile contaminant, this solvent regeneration technique to remove the non-volatile component does not need to be performed as frequently as the removal of the volatile component.

Figure 1:
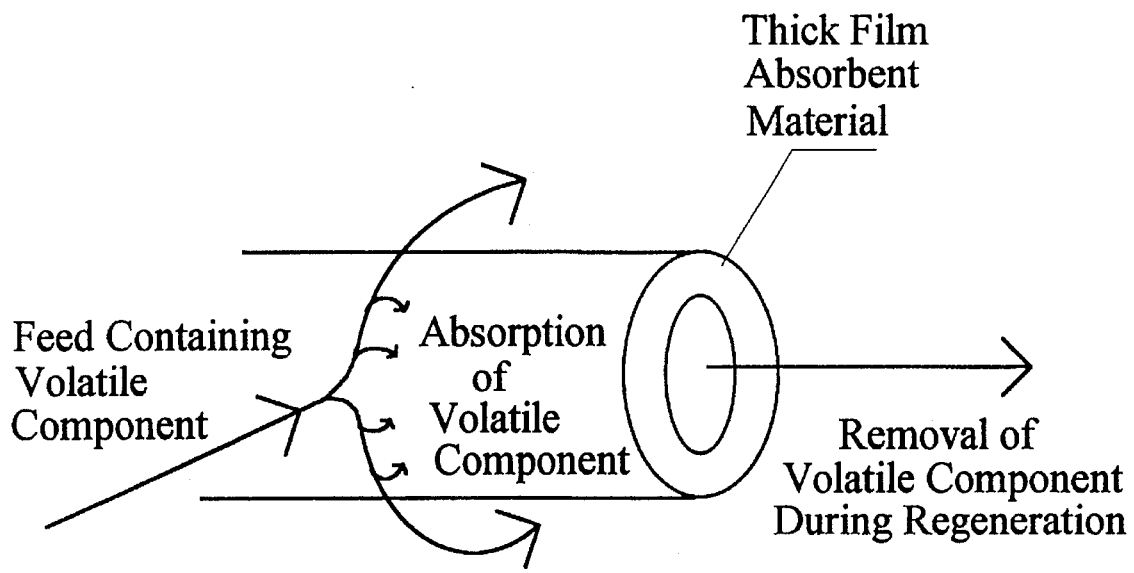
FIG. 1 shows a schematic of the process for absorbing or adsorbing the volatile component into the outer surface (first side) of a tube wherein the tube wall comprises a thick film of absorbent material.
Figure 2:
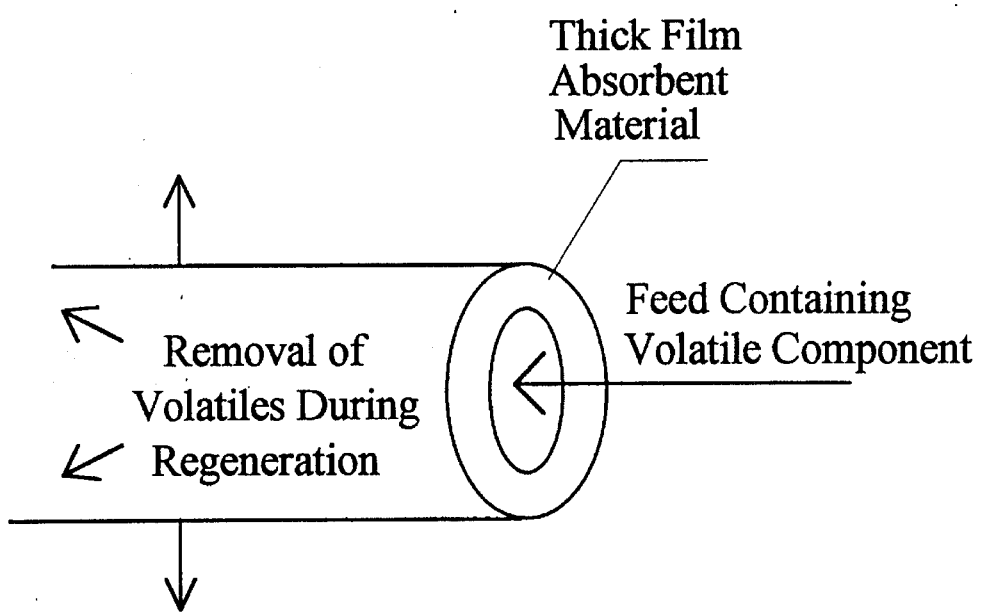
FIG. 2 shows a schematic diagram of the process for absorbing a volatile component into an inner surface (first side) of a tube, wherein the tube wall comprises a thick film of absorbent material.
Figure 3:
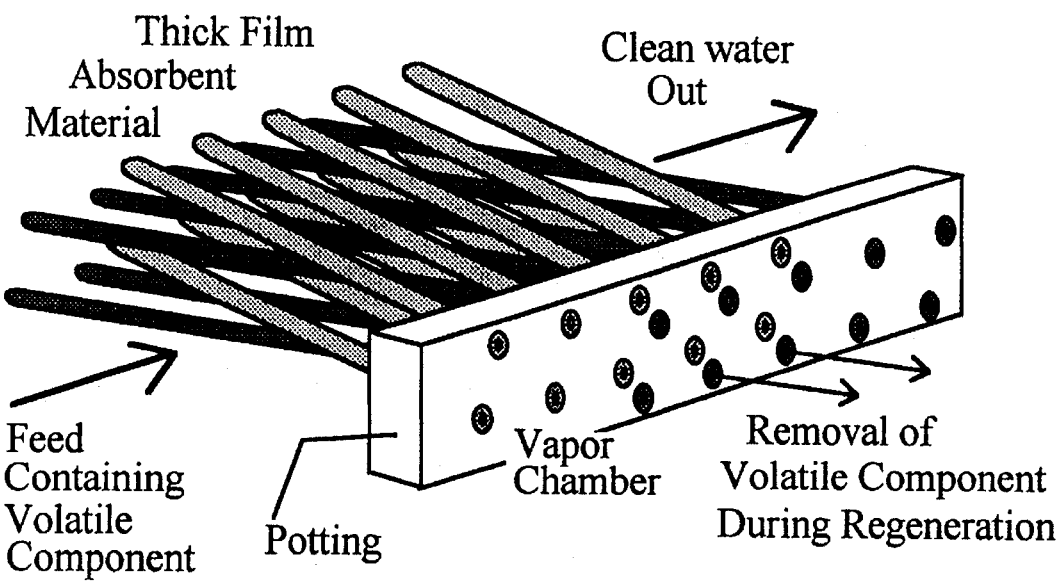
In FIG. 3 (a) shows a schematic diagram of an inventive device with an array of tubular absorbent materials arranged in a module such as that the outer surfaces(first sides)are exposed to an communicating with the mixture chamber.
Figure 3:
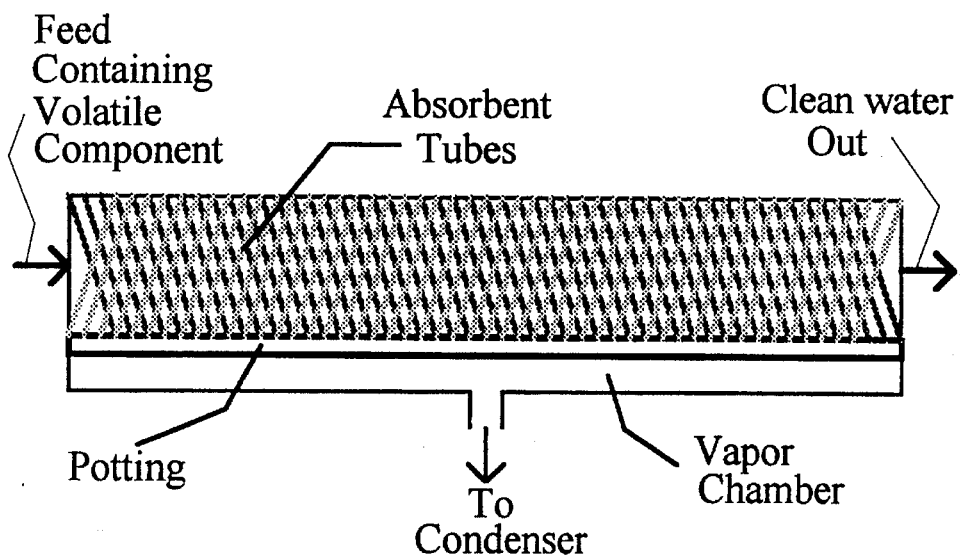

Also in FIG. 3 (b) the vapor chamber communicates with the condenser to collect the volatile component during regeneration.

Figure 4:
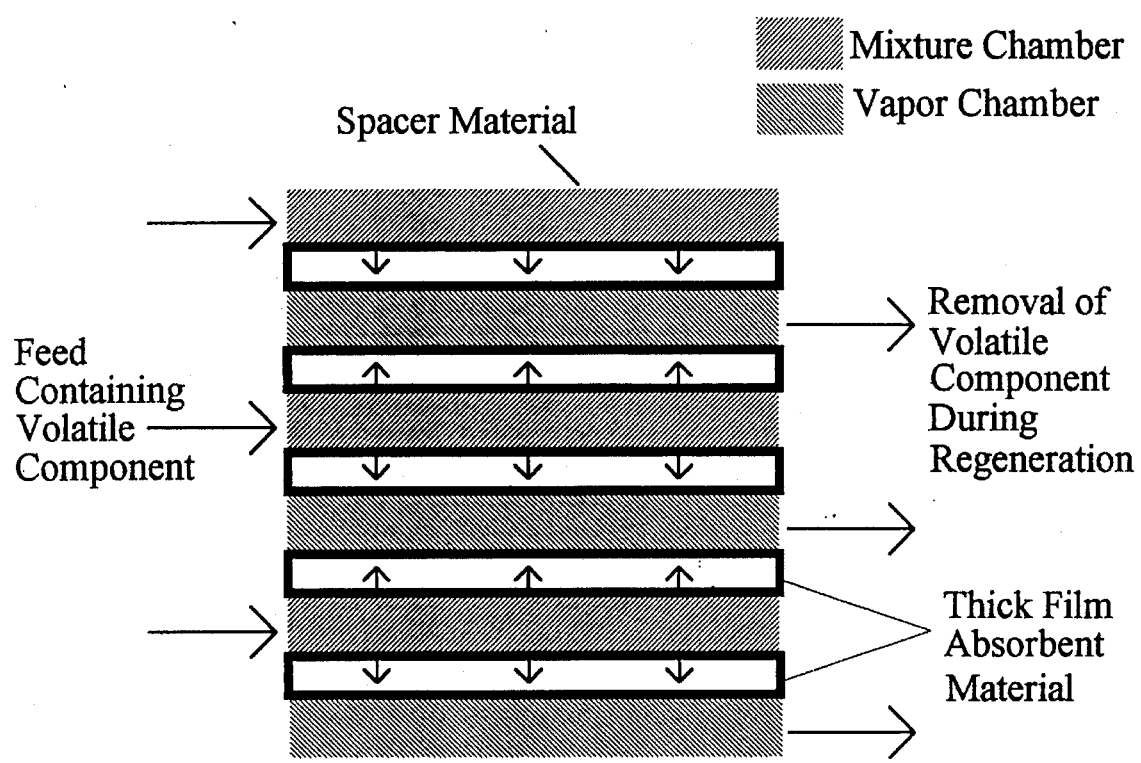

FIG. 4 shows a schematic diagram for absorbing a volatile component into a first surface of a flat sheet of a thick film of absorbent material and alternating layers of spacer material to form a mixture chamber and a vapor chamber.

Figure 5:
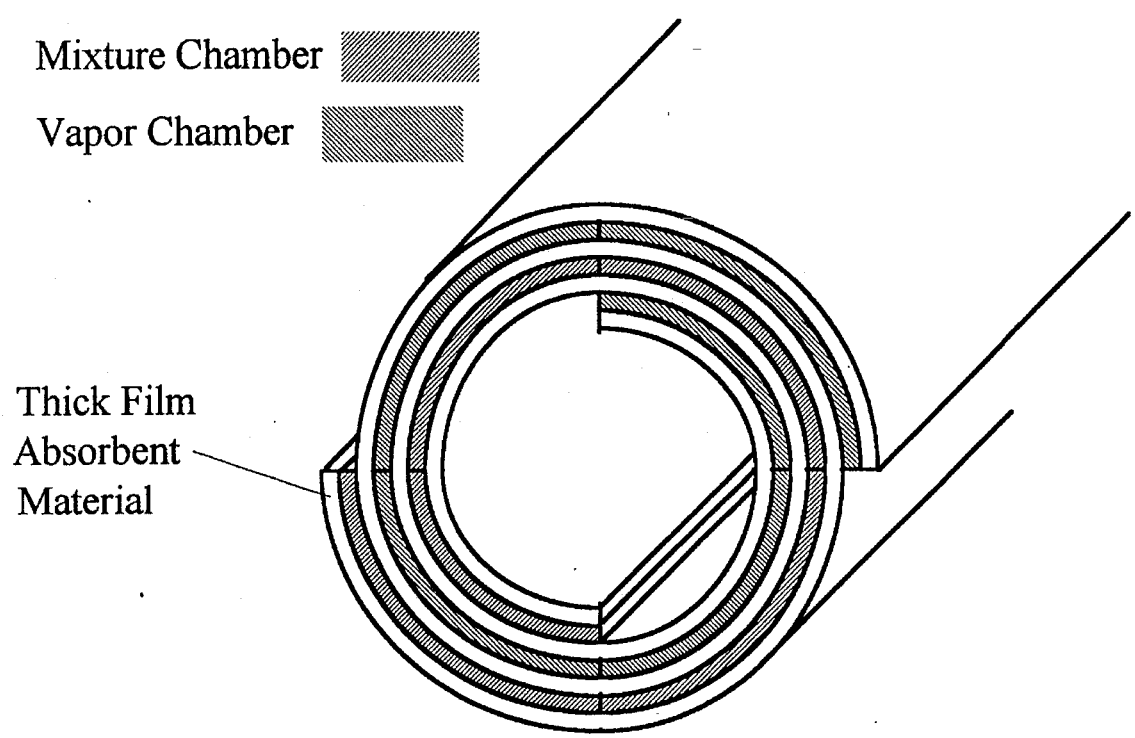

FIG. 5 shows a diagram of a process for absorbing a volatile component into a first surface of a curved sheet arranged in spiral configuration.

Figure 6A:
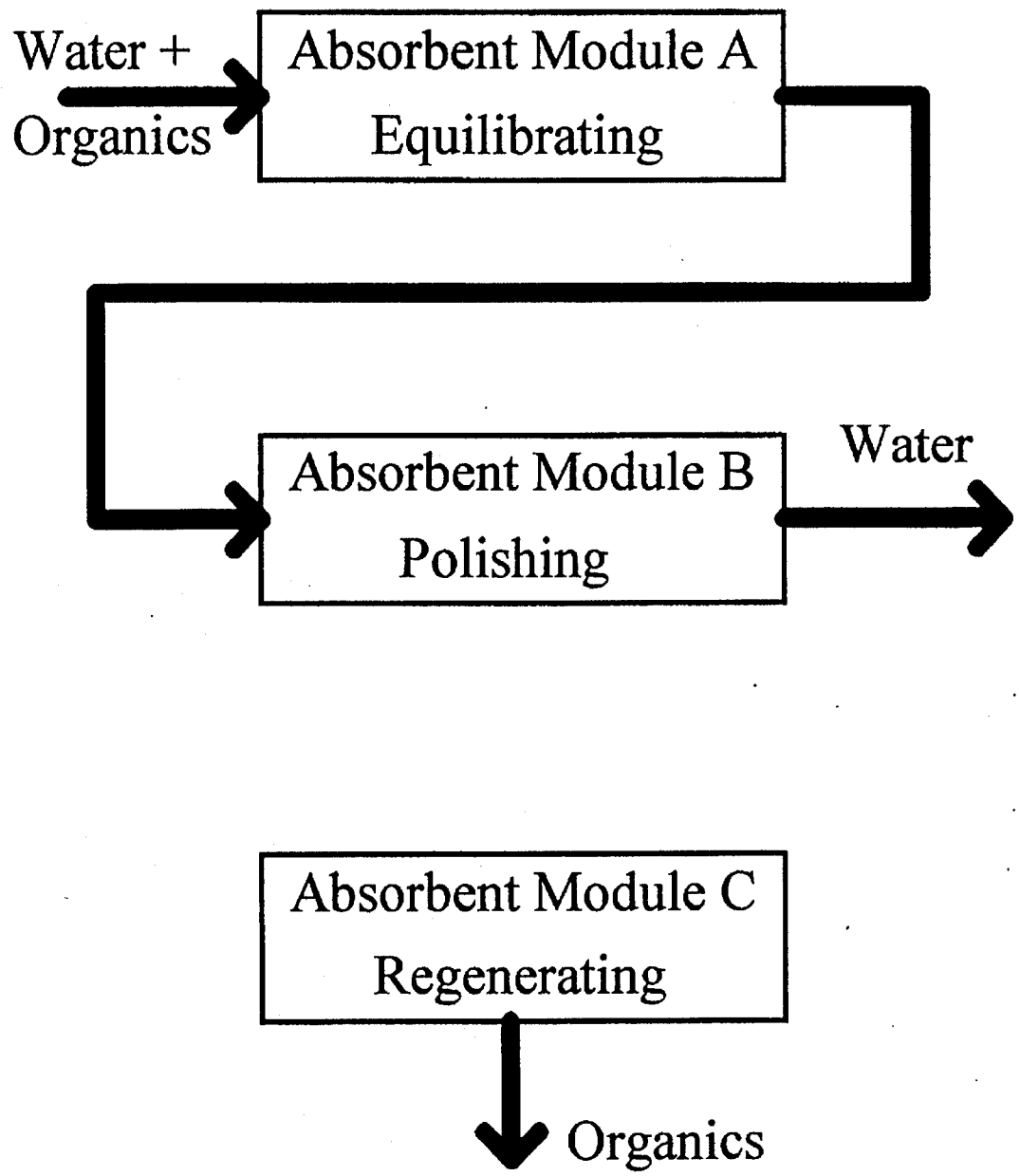
Figure 6B:
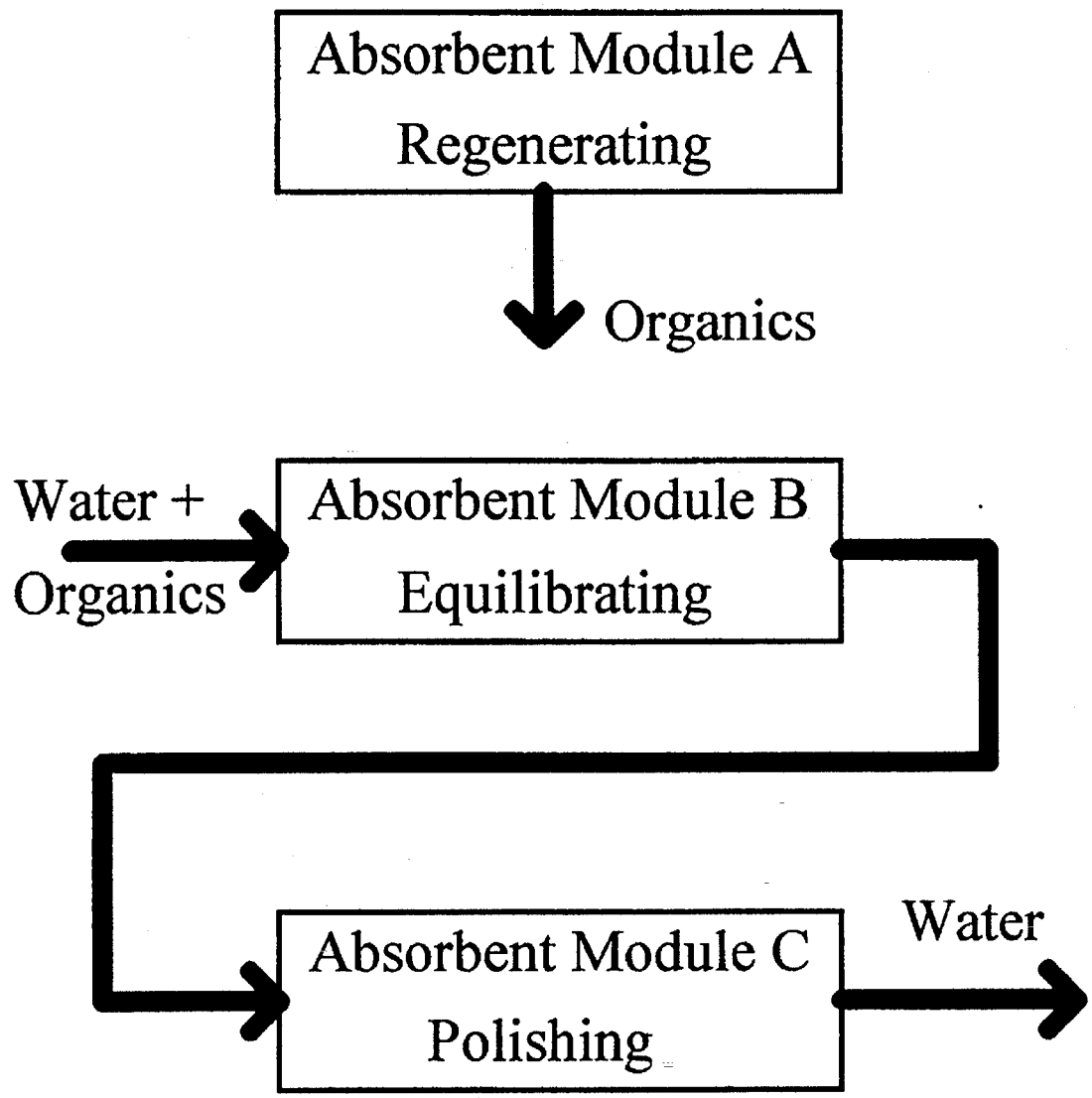
Figure 6C:
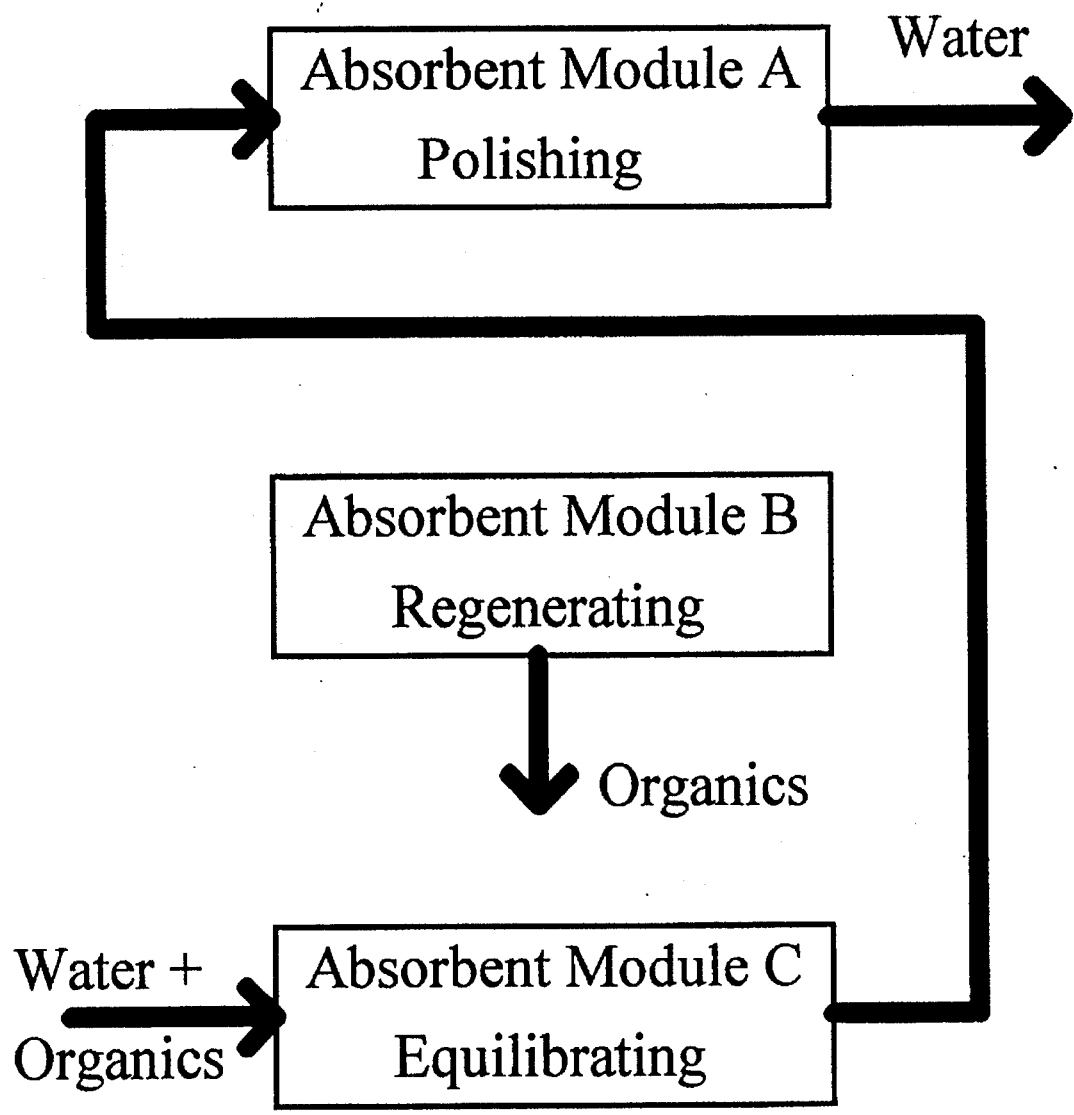

FIG. 6 (a)(b)(c) show schematic diagrams of how a batch process can be converted in a continuous process.

Figure 7:
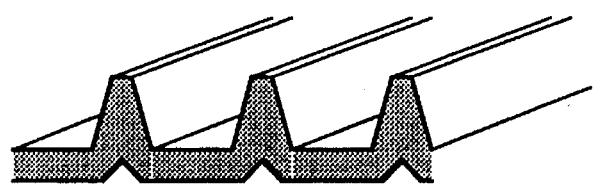
Figure 7:
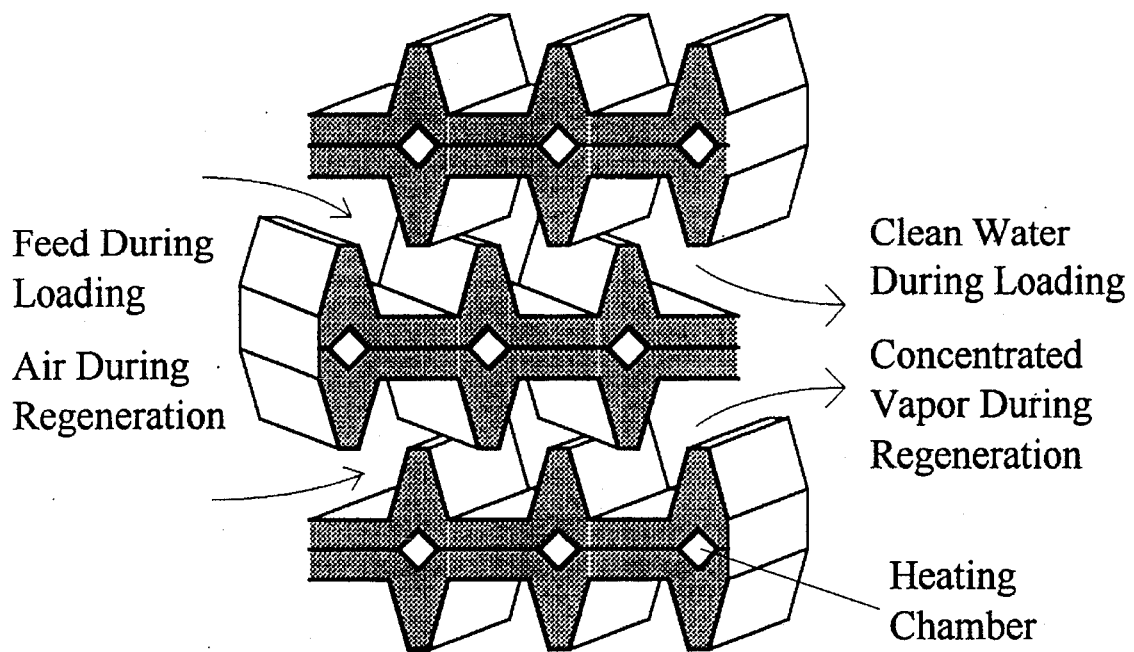

FIG. 7 illustrates a film pattern of absorbent or adsorbent material with protuberances within the mixture chamber, to extend the surface area of the first side of the film.

Figure 8:
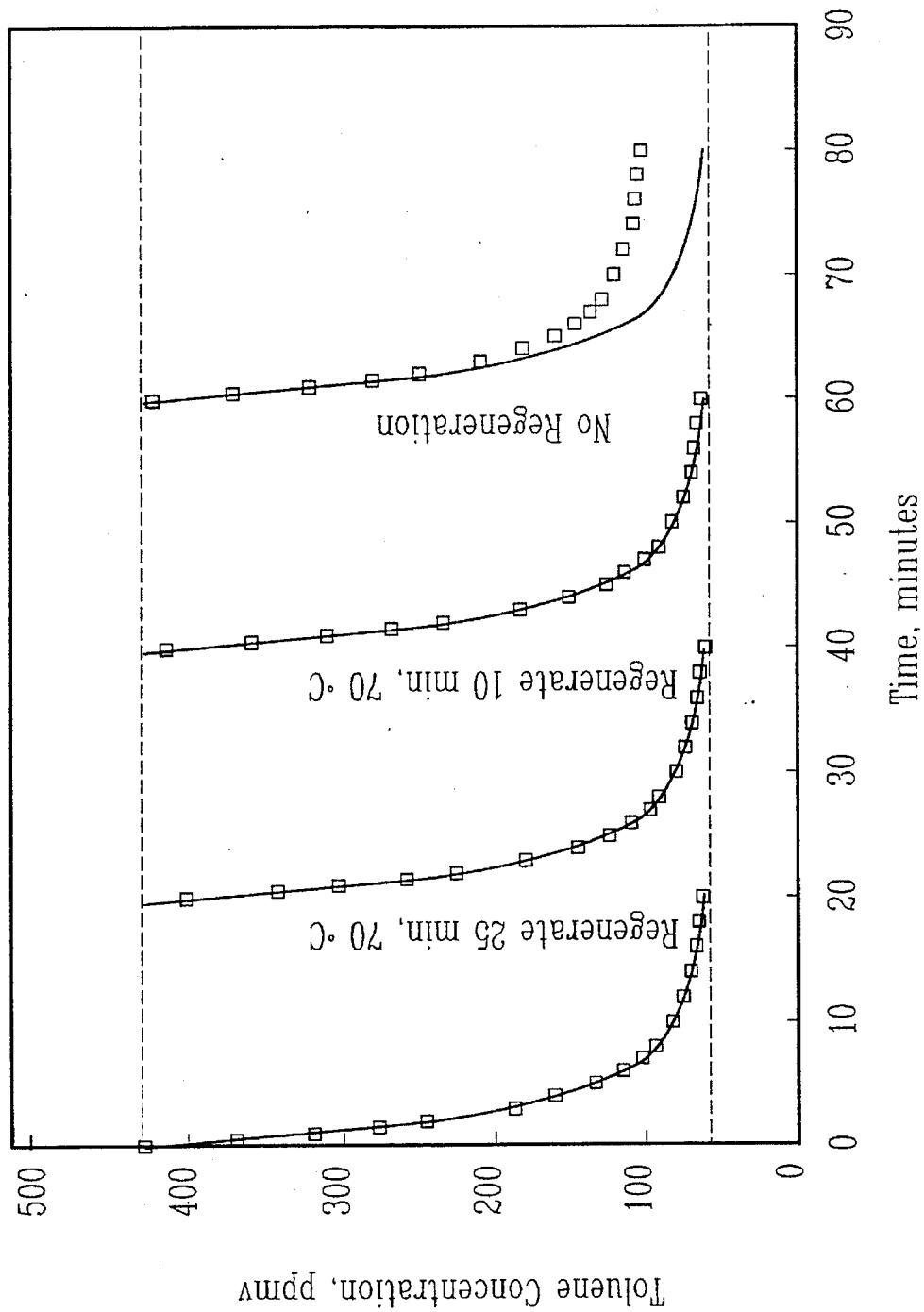

FIG. 8 shows the removal of toluene from water using the prototype device of the type shown in FIG. 3.

Figure 9:
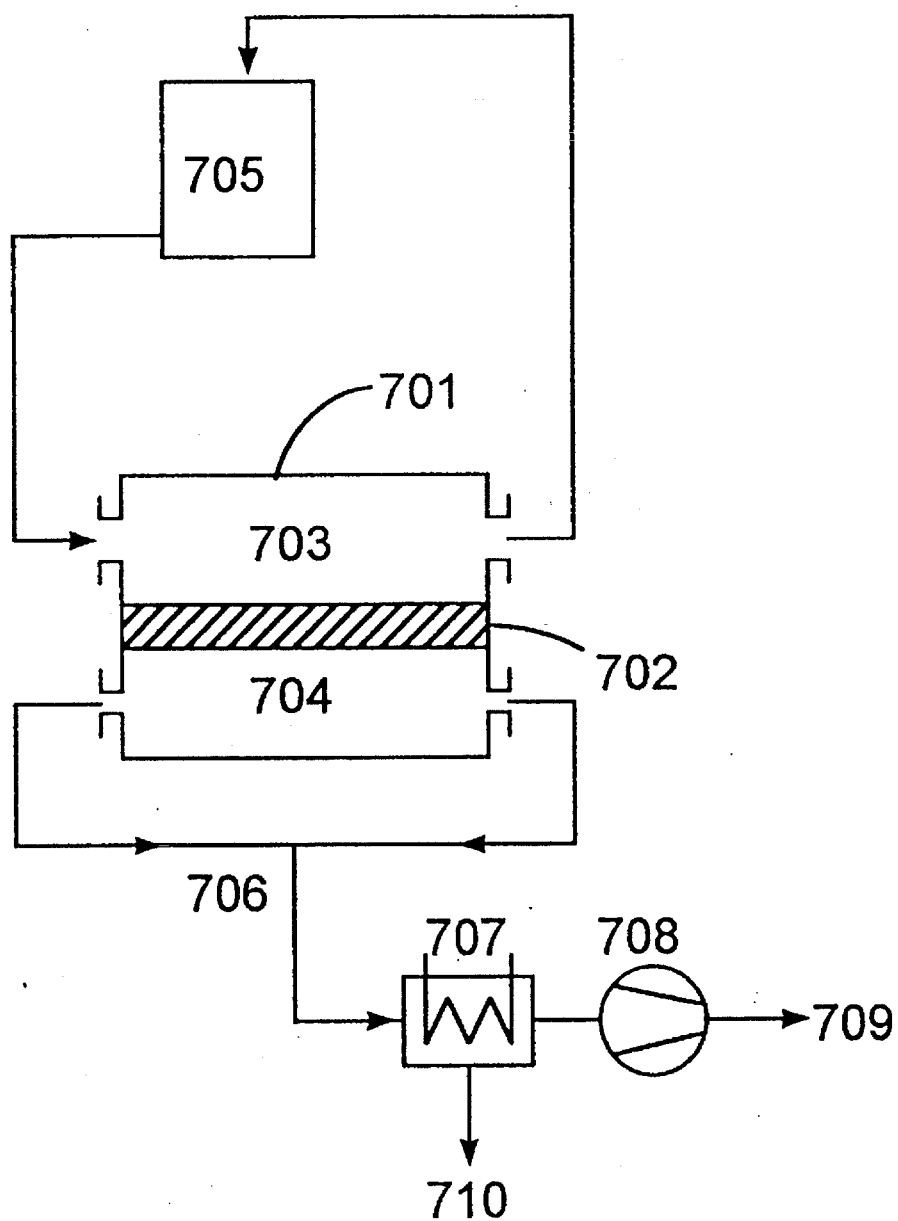

FIG. 9 shows the device (701) operated during a regeneration cycle having a thick film (702) separating a mixture chamber (703) and a vapor chamber (704). The mixture chamber is filled with a hot fluid from a reservoir (705) and the vapor chamber (704) is connected to a condenser system (707) followed by a vacuum pump (708) which removes non-condensable gases (709) from the vapor chamber. Volatile components are chilled on the condenser (707) to form a product stream (710).

DETAILED DESCRIPTION OF THE INVENTION

The present invention provides a thick film equilibrium device and process for removing dilute volatile components from feed streams efficiently and thoroughly. Feed streams can comprise aqueous, organic or gaseous sources of volatile components, wherein it is desired to remove the dilute volatile components with a minimum of energy expended. The inventive process uses a two-step operation. The first step is essentially an absorption or adsorption process and the second step is a desorption or regeneration process with similarities to membrane pervaporation.

In the first step, the volatile component (contaminant) is adsorbed or absorbed into a film composed of absorbent or adsorbent materials. The process of absorption or adsorption is an equilibrium process as described in the Background section. Instead of a thin film, as used in pervaporation, the inventive process requires a thick film composed of absorbent or adsorbent materials to provide the capacity to absorb or adsorb and store the volatile component. The absorbent or adsorbent materials of the present invention must not only have the capacity to absorb or adsorb volatile components from the feed stream, but must also have intimate contact with the feed stream to allow the volatile components to come into contact with the absorbent or adsorbent material that comprises the film.

When the feed is a liquid, mass transfer of the volatile components from the feed stream to the first surface of the film comprising absorbent or adsorbent material is normally the rate-determining step in the present invention as it is in most absorption and pervaporation processes with dilute feeds. Adequate fluid distribution and a large surface area of film sorbent material can assure adequate mass transfer. Adequate fluid distribution can be achieved, for example, by various module design paRems such as those shown in FIGS. 3, 4, 5, and 7 herein. Surface area can be manipulated through adjustment of film thickness and by addition of protuberances. For example, a flat sheet film has a surface area to volume ratio (considering the surface area of the first side of the film only) of one divided by the film thickness. Therefore, a 1.0 mm (0.001 m) thick film has a surface area to volume ratio of 1000 $m^2/m^3$. For liquid feed streams with a dilute concentration of volatile contaminant (for example of concentration of volatile component of less than 1000 parts per million by volume (ppmv)) where a large volume of feed stream must come into contact with a small volume of film sorbent material, the surface area to volume ratio should be greater than 500 $m^2/m^3$, and preferably greater than 1000 $m^2/m^3$. For more concentrated feed streams (i.e., a concentration of volatile component of greater than 1000 ppmv), the surface area to volume ratio should be greater than 200 $m^2/m^3$, preferably greater than 500 $m^2/m^3$ and most preferably greater than 1000 $m^2/m^3$. This means that flat sheet and tube films should have a thickness of less than 5 mm and preferably have protuberances or fins to increase surface area of the first side of the film and increase the volume of sorbent material. For gaseous feed streams, the surface area to volume ratio should be greater than about 100 $m^2/m^3$, and preferably greater than 200 $m^2/m^3$. Moreover, in order to allow the sorbent material to ads orb or absorb a practical amount of the volatile component, the film thickness must be greater than about 0.1 mm. Preferably, the film thickness is in the range of from about 0.5 mm to about 2.0 mm. Solution-diffusion membrane thicknesses, by contrast, are in the range of from 0.0005 to 0.05 mm thick for most pervaporation membranes used for this application.

The first step is a loading step wherein the volatile component is loaded into the film composed of absorbent or adsorbent materials. The feed flows in a manner to contact the first side of the film composed of absorbent or adsorbent materials and the film absorbs or adsorbs volatile components until equilibrium is reached or approached. This is why it is an equilibrium process. The absorbent or adsorbent materials are arranged in a format such as to maximize the surface area of the first side that is in contact with the fluid mixture. For example, FIG. 3 depicts an array of tubular films with the outer surface comprising the first surface of the film. In a similar fashion, the films can also be arranged in a planar or a spiral configuration or having protuberances.

It is desirable to arrange the films of absorbent or adsorbent material such that there is a large surface area in contact with the fluid mixture chamber and to provide mixing to increase mass transfer. Moreover, the arrangement of tubes must account for swelling of the tubes upon absorption of the volatile components. Initially, the tubes should be arranged with a packing density of 20 to 30%, such that upon swelling, the packing density can increase to, for example, 25 to 40%, depending upon the amount of swelling.

The film must be composed of a material that will absorb or adsorb the volatile component. For example, silicone rubber will absorb toluene from an aqueous solution. A saturated solution of toluene in water contains 600 ppmv (parts per million by volume) toluene. Silicone rubber in equilibrium with a 600 ppmv toluene solution absorbed 20.5% toluene and also absorbed about 1% water. This difference in absorptive capacity for toluene and water is because silicone rubber is a hydrophobic material.

Therefore, a "Concentration Factor" is defined as [the volume of absorbed component per volume of absorbent] divided by [the volume of absorbed component per volume of feed solution]. For toluene in the above toluene-solution/silicone-rubber experiment, the Concentration Factor was (20.5/100)/(600/1000000)=340. For water in the toluene-solution/silicone-rubber example, the Concentration Factor was (1/100)/(999400/1000000)= 0.01. Therefore, toluene had a Concentration Factor much greater than 1, and preferred to be in the silicone rubber phase, while water had a Concentration Factor much less than 1 and preferred to remain in the feed solution. Selectivity was the Concentration Factor for the component to be absorbed divided by the Concentration Factor for the component to remain behind. In the toluene/water/silicone-rubber example, Selectivity was 340/0.01= 34,000.

Trichloroethylene has a solubility in water of about 700 ppmv. For an aqueous solution of trichloroethylene (500 ppmv), the Concentration Factor was measured as 150 and the Selectivity was 15,000. A high Concentration Factor indicates that only a small volume of absorbent material will be required to remove the absorbed volatile component from a large volume of feed solution. A high Selectivity indicates that very little of the components to be left (water) will be absorbed in the inventive process, allowing the separation to be relatively complete.

In absorption, the Concentration Factor and Selectivity are almost constant for all concentrations of volatile component up to the solubility concentration. A 50 ppmv aqueous solution of toluene had a Concentration Factor of 300 and a Selectivity of 30,000.

Ethanol and water are fully miscible. A saturated solution of ethanol in water contains 100% ethanol, which will swell silicone rubber to 2%. In an ethanol/water/silicone-rubber system, the Concentration Factor for ethanol is (2/100)/(100/100)= 0.02. The Concentration Factor for water in ethanol is (1/100)/(100/100)=0.01. The Selectivity for ethanol over water is 0.02/0.01=2. The low Concentration Factor and low Selectivity means that silicone rubber has a low capacity for absorbing ethanol from water and performs a poor separation.

In general, the process is most feasible with higher Concentration Factors and Selectivities. Preferably, the Concentration Factor should be at least 100 and most preferably at least 1000. The Selectivity should be at least 100, preferably 1000 and most preferably greater than 10,000. However, the separation of high value components is feasible with Concentration and Selectivity factors as low as about 10.

The present invention is most effective when (1) the absorbent material has a high capacity for the component to be absorbed, (2) the absorbent has a low capacity for the component(s) to be left behind, (3) the component to be absorbed has a low solubility in the component to be left behind (as in the toluene-water example above), and (4) the absorbed component is sufficiently volatile to perform the regeneration step. The first and second conditions above result in high Selectivity and the first and third conditions above result in a high Concentration Factor. In general, the low solubility condition can be met if one component is polar (e.g., water) and the other component is non-polar (e.g., toluene or trichloroethylene). The more polar and non-polar, respectively, the lower is the solubility. If a non-polar component is to be removed from a polar component (e.g., dilute toluene from water), the absorbent material should be hydrophobic (e.g., silicone rubber). This will satisfy condition 1 and 2 above, as the non-polar component will absorb readily into the hydrophobic material, and the polar component will not. Conversely, if a polar component is to be removed from a non-polar component (e.g., dilute water from toluene), the absorbent material should be hydrophilic (e.g., polyvinyl alcohol). This will satisfy conditions 1 and 2 above, as the polar component will absorb readily into the hydrophilic material, and the non-polar component will not.

A major use for the inventive device and process will be to remove low solubility volatile organic components from water. This procedure is feasible if the solubility of the volatile component in water is about 2% or less or, preferably, 2000 ppmv or less, and the boiling point of the volatile component is 200° C. or less (meeting condition 4 above). Volatile components that are organic molecules that meet these criteria include, for example:

alkanes, alkenes and alkynes having 5 to 12 carbon atoms (e.g., octane, isohexane, cyclopentane, and hexene);

halogenated alkanes (e.g., carbon tetrachloride, bromobutane, and pentachloroethane);

halogenated alkenes (e.g., dichloroethene and bromopropene);

alkanols (alcohols) containing 5 to 9 carbon atoms (e.g., amyl alcohol and octanol);

alkanals (aldehydes) containing 5 to 10 carbon atoms (e.g., benzaldehyde and heptanal);

ethers containing 5 to 10 carbon atoms (e.g., methylphenyl ether and dipropyl ether);

esters containing ∝to 10 carbon atoms (e.g., butyl formate, ethyl methacrylate and vinyl acetate);

aromatics having at least one benzene ring (e.g., benzene, toluene, xylenes and ethyl benzene);

halogenated aromatics (e.g., bromotoluene and dichlorobenzene);

acids containing 5 to 7 carbon atoms (e.g., hexanoic acid);

amines (e.g., dimethyl analine and tripropyl amine);

terpenes (e.g., pinene, limonene and menthol), and combinations thereof.

Other organic compounds that have the required solubility in water and volatility include, for example, mustard oil, mercaptans, camphor, camphene, citronellal, coniine, cresol, cumene, diethyl sulfide, dimethyl carbonate, dimethyl sulfate, ethyl nitrate, furfuran, glyceryl trinitrate, isoprene, nitrocresol, phosgene, pyrrole, styrene, thiophenol, thiophene, and the like. Some inorganic compounds can also meet the requirements of solubility in water and volatility include, for example, iodine, and the like.

Hydrophobic absorbent materials suitable for separating the above-listed volatile components from dilute aqueous solutions include rubbery hydrophobic polymers, semicrystalline or crosslinked to provide chemical resistance to an organic solvent. Suitable absorbent materials include, for example:

synthetic rubbers (e.g., silicone rubber, chloroprene, butyl rubber, ethylene-propylene diene rubber, fluorinated rubbers, nitfile rubber, and the like);
polyolefins (e.g., polypropylene and poly n-methyl pentene);
epoxy resins;
polyvinylchloride and similar polymers;
polytrimethylsilylpropane and similar polymers;
polyimids;
polyamids; and combinations thereof.

Hydrophilic absorbent materials are suitable for separating aqueous (water) or other volatile polar components (e.g., low molecular weight alcohols) from dilute solutions in the above-exemplified non-polar components. Suitable hydrophilic absorbent materials are rubbery hydrophilic polymers that are semicrystalline or crosslinked to provide chemical resistance and include, for example polyvinyl alcohol, polyvinyl pyrolidone, cellulose esters, and combinations thereof.

Adsorbents can be used in addition to or instead of absorbents. Adsorbents behave differently to absorbents and the need for low solubility of the volatile components in the feed solution does not apply. The important difference between absorption and adsorption is that in absorption, the absorbed component dissolves in and swells the absorbent material. In adsorption, the adsorbed component enters microscopic pores in the adsorbent material and bonds chemically or physically to the surface of these pores. Macroscopically, the two processes appear similar, because heat and pressure changes cause desorption in both cases. Some adsorbents (e.g., activated carbons) are widely applicable and adsorb most low solubility organic components from an aqueous solution. Other adsorbents are more specific, such as cyclodextrins that can specifically adsorb, for example, methal. In the case where the adsorbents are specific, the condition of low solubility is not necessary because the specificity of the adsorbent material provides a means for increasing the Concentration Factor and the Selectivity. It remains the situation that adsorption of a component from a feed stream (even of fully miscible compounds) is more feasible with a dilute feed.

Adsorbents can be used in the inventive device and in the inventive process in two ways. First, adsorbents can be incorporated directly into thick films (e.g., adsorbent resins and polymers) and used directly (possibly with the assistance of a physical supporting means to provide skeletal support. Second, adsorbents that cannot be incorporated into films (e.g., powders and particles) can be incorporated into a binding agent that is then formed into a film. For example, silicone rubber can be filled with silicalite particles to increase its capacity for some organic volatile components and create a hybrid absorbent and adsorbent material film. The binding agent can also be absorbent, and must at least be permeable to the component to be adsorbed. Examples of adsorbent materials include, for example, aluminas (e.g., activated bauxite), siliceous materials (e.g., silica gel, clays, diatomaceous earth and the like), activated carbons, resins and polymers (e.g., cyclodextrins), zeolites (e.g., silicalite), and combinations thereof.

For a given volume of absorbent material (Va), the volume of volatile component (Vo) can be calculated according to the following equation:

$$Vo=(Va)(K)(C),$$

wherein K is the Concentration Factor and C is the concentration (volume fraction) of volatile component within the feed. For example, when one confronts a typical situation of a leaking underground storage tank from a former gasoline service station site, there is, among other components, toluene contaminating the ground water in a relatively low concentration. Toluene is the volatile component in a dilute aqueous solution and silicone rubber can be used as the film material, using a device such as the one shown by schematic in FIG. 3. One cubic meter of silicone rubber (absorbent material) operating on a 500 ppmv (a typical example for a leaking tank) toluene stream with a concentration factor of 340 can remove $Vo=1\times340\times(500\times10^{-6})=0.17$ m$^3$ of toluene per batch. This corresponds to treating a volume of aqueous feed stream of $Vf=Vo/C=0.17/(500\times10^{-6})=340$ m$^3$ of feed stream. These calculations mean that one m$^3$ of silicone rubber arranged in an inventive device can remove all of the toluene (500 ppm by volume) from 340 m$^3$ of aqueous feed stream (e.g., ground water). This provides a simple relationship whereby the maximum volume of contaminated feed stream that can be treated prior to regeneration is equal to (K) (Va). Therefore, the larger the concentration factor K, the more feed stream that can be treated prior to regeneration.

In practice, it is desirable to measure the outflow of the feed stream for "breakthrough" of the volatile contaminant. Once breakthrough has occurred, the absorbent or adsorbent material is regenerated by a desorption process similar to pervaporation. This desorption process is an equilibrium process (as opposed to conventional pervaporation which is a rate process). The regeneration step applies a vacuum (or at least a reduced atmospheric pressure) or a sweep gas to the vapor chamber and also replaces the feed in the mixture chamber with hot liquid or gas having a temperature from about 30° C. to about 150° C., preferable from about 60 ° C. to about 100° C. The heat from the hot liquid or gas provides a driving force for the volatile components that were absorbed or adsorbed into the adsorbent or absorbent material to permeate to the second side of the absorbent or adsorbent material and evaporate into the vapor chamber. The concentration or activity of volatile component in a gaseous state will be very low in the vapor chamber, allowing for equilibrium to drive essentially all of the volatile component out of the adsorbent or absorbent material during the regeneration step. During the regeneration step, some water may permeate across the thick film and evaporate into the vapor chamber. The evaporation of water will consume some extra energy but it is also of benefit. The water vapor acts as a sweep gas in the vapor chamber, reducing the partial pressure of organics in the vacuum and this increases the driving force for regeneration.

Preferably, the vapor chamber further comprises a condensing surface to allow the volatile component to condense into a liquid on the condensing surface and be collected as a liquid in a substantially isolated form for recovery, recycling or destruction. When regeneration is essentially complete, the inventive device can be reused and the method repeated with another adsorption or absorption step. Preferably, the inventive device comprises a series of modules to simultaneously conduct each step of the inventive process (see FIG. 6).

Using the toluene situation as an example for the regeneration step, enough heat must be supplied to raise the temperature of the 1.17 m$^3$ of toluene-swollen silicone rubber to about 90° C., and evaporate the 0.17 m$^3$ of absorbed toluene (ignoring any water that may have permeated through the thick film). This amounts to about 0.3 GJ of heat (80 kWh or 280,000 BTU) for each 340 m$^3$ (about 90,000 gallons) of feed stream. In conventional pervaporation, by contrast, enough heat must be supplied to raise 340 m³ of feed stream to, for example, 60° C. and to evaporate the 0.17 m³ of toluene (ignoring water permeation). Thus, conventional pervaporation requires about 60 GJ (16,000 kWh or 50,000,000 BTU) for each 340 m³ (90,000 gallons) of feed stream. Therefore, the present invention can save more than 99% of the energy used by conventional pervaporation. However, there may be energy recovery schemes utilized in conventional pervaporation of, at most, 90%. Even with the best possible energy recovery, conventional pervaporation still consumes more than ten times the amount of energy as the inventive method, as this example illustrates.

In a variation of the inventive device, it is possible to configure the device such that the chamber can act as both a mixture chamber during the loading step and a vapor chamber during the regeneration step. The other chamber communicating with the second side of the thick film, can act as a heating chamber during regeneration. Therefore, with this alternate configuration, during regeneration, hot or warm fluid or gas is introduced into the heating chamber and volatile component vapor is removed in the mixture/vapor chamber as is shown in FIG. 7.

The present invention and inventive device can also be used to remove low solubility non-volatile organic components from aqueous feeds. The equilibrium absorption or adsorption process is the same, however, the regeneration process will include an extra non-volatile regeneration step and it would occur prior to the evaporative regeneration step described herein. The non-volatile regeneration step comprises filling the vapor chamber with a liquid volatile organic solvent (referenced to here as "Solvent"), whereby the non-volatile organic components absorbed in the absorbent material would diffuse into the Solvent, to regenerate the absorbent material from the non-volatile component. Some absorbed volatile components would also be removed into the Solvent. The evaporative regeneration step can be run next to remove any Solvent that has been coincidentally adsorbed, and complete the regeneration of the module. The Solvent can be any liquid solvent that would have high solubility for the non-volatile component. Examples of such solvents include a $C_3$–$C_{10}$ alcohol, or a $C_4$–$C_{10}$ alkane or alkene, and combinations thereof. An alcohol (e.g., isopropanol) is preferred because it is volatile (boiling at 83° C.) and will only be absorbed to 2% in silicone rubber, and is less toxic than many solvents.

The additional solvent regeneration step, together with an evaporative regeneration step can remove incidental non-volatile organic contaminants that are found in remediation operations or process streams but which are not the specific targets of the process. For example, a process to remove benzene may encounter low levels of dissolved oils with low volatility. In such cases, the non-volatile contaminants may build up in the absorbent material with no means for removal. Solvent regeneration applied every 10 to 1000 cycles would remove the trapped non-volatile contaminants and restore the efficiency of the process for volatile components. If, for example, the inventive process were used for removal of nonvolatile or low volatility organic contaminants, such as dioxins, polychlorobiphenyls (PCBs) pesticides or herbicides, solvent regeneration could be employed every cycle.

In order to examine absorption capacity of potential absorbents for a thick-film equilibrium process, Concentration Factors were measured for several absorbent polymers and volatile components, as shown in Table I.

TABLE I

| Volatile Component | Absorbent Polymer | Feed Concentration | Absorbent Concentration | Concentration Factor |
|---|---|---|---|---|
| Toluene | Polydimethylsiloxane | 600 ppmv | 20.5 vol % | 340 |
| Toluene | Polydimethylsiloxane | 50 ppmv | 1.5 vol % | 300 |
| Toluene | Chloroprene | 600 ppmv | 25 vol % | 420 |
| Toluene | Polyvinylchloride | 600 ppmv | 28 vol % | 470 |
| Trichloroethylene | Polydimethylsiloxane | 300 ppmv | 4.5 vol % | 150 |

The Concentration Factor for toluene and silicone rubber (polydimethylsiloxane) was measured at two different concentrations (600 and 50 ppmv) differing by an order of magnitude, and the Concentration Factor was roughly constant (340 and 300 respectively). In order to show that other polymers can be of utility, chloroprene and polyvinylchloride were also tested with toluene solutions, giving Concentration Factors of 420 and 470 respectively. In order to show that other volatile organics can be treated, trichloroethylene was tested using silicone rubber, giving a Concentration Factor of 150. Examples with even higher Concentration Factors can be found in the literature. For example, polytrimethylsilylpropyne has a Concentration Factor of 940 for trichloromethane in aqueous solutions (Robeson et al., *Separation Science and Technology*, 27: 1245–1258). Even higher Concentration Factors might be possible using specialty polymers, for example derivatives of silicone rubber.

In order to show that absorption occurs in the gas phase as well as the liquid phase, polydimethylsiloxane was equilibrated with air saturated with toluene vapor at 25° C. The equilibrium absorbent concentration was 26 vol %, which is slightly higher than the absorbent concentration measured with saturated aqueous toluene solutions. Thus, performance of a thick film equilibrium process should be similar for both saturated toluene vapor in the gas phase (at 25° C.) and saturated toluene solution in an aqueous phase.

In order to assess the technical feasibility of the thick film equilibrium process and device, a small-scale experimental device of the type shown in FIG. 3 was constructed and tested in a batch experiment. One liter of solution containing 430 ppmv toluene was recirculated at a velocity of 0.16 m/s through the mixture chamber of a module containing 8.6 m (28 ft) or 26 grams (26 ml) of silicone rubber tubing (2.2 mm o.d., 1.0 mm i.d.) for 20 minutes. The mixture chamber of the module was then filled with water maintained at 70° C., and air was blown through the insides of the tubes (the vapor chamber) to expel the toluene vapors. This "sweep-gas" form of regeneration was performed for 25 minutes; however no condensing surface was provided and no concentrated organic stream was collected. The 20 minute absorption step was then repeated, followed by a 10 minute regeneration, and then the absorption step was repeated again followed by no regeneration, and then the absorption step was repeated a final time. The results are shown in FIG. 8.

The results show that the absorption step proceeds in an identical fashion with new silicone rubber tubes in a new device as it does after 25 or 10 minutes regeneration at 70° C. The initial slope of the concentration profile in each absorption step gives a mass transfer coefficient for the device of $(0.9\pm0.1)+10^{-4}$ .m/s. Higher and lower mass transfer coefficients were achieved in similar experiments by increasing or decreasing the feed flow rate, as shown in Table II.

TABLE II

| Feed Velocity in Mixture Chamber, m/s | 0.04 | 0.16 | 0.4 |
|---|---|---|---|
| Measured Mass Transfer Coefficient, m/s × 10$^4$ | 0.4 | 0.9 | 1.2 |

The final solution concentration in the experiments in FIG. 8 (~50 ppmv) corresponded to a Concentration Factor of 300 (i.e., the concentration of toluene in the silicone rubber was 300 times higher than the concentration of toluene in the solution). When no regeneration was performed, the solution equilibrated at approximately double the feed concentration and double the absorbent concentration, maintaining a constant Concentration Factor, as expected.

This experiment shows that the absorption step of the process works and is repeatable, that the regeneration step proceeds rapidly even at 70° C., and that the cycle of absorption and regeneration is repeatable. More rapid regeneration is expected at higher temperatures, e.g., 95° C. The data obtained for the device mass transfer coefficient and the Concentration Factor can be used to design full-scale continuous processes.

The present invention provides several advantages to overcome biological, mineral and organic fouling problems that can occur. In biological fouling, for example, the regeneration step will expose the absorbent material to high temperatures that can fully or partially sterilize the modules. It is possible to use even higher temperatures with or without pressure to completely sterilize the modules. Even if sterilization is not achieved, the cyclic temperature profile is damaging to biological growth. Moreover, when the volatile component is a toxic organic material, the presence of the toxic organic material within the absorbent material will generally be toxic to microorganisms and certainly retard microorganism growth. When silicone rubber is used as an absorbent material, it is biologically inert and will not provide a nutrient source for microorganisms. When the absorbent materials swells and contracts during loading and regeneration cycles, this action will hinder fowling by mineral deposition and facilitate sloughing of any mineral deposits. Moreover, if surface fouling occurs with nonvolatile organic fouling materials, one can perform a solvent regeneration step by flooding the mixture chamber with a volatile solvent or surfactant solution prior to regeneration, wherein the volatile solvent or surfactant solution has a high solubility for the non-volatile organic fouling material, and removing the non-volatile organic fouling material from the mixture chamber by removing the solvent or surfactant solution. Regeneration can proceed following non-volatile organic removal.

Example 1

This example illustrates construction of a thick film equilibrium device and process for using the device designed to remove volatile components from ground water surrounding the site of a leaking underground gasoline tank. In this example, the feed stream is ground water or water wash of the soil. The volatile components are the volatile components of gasoline, including for example, toluene, benzene, xylene, alkanes, alkenes and cyclic hydrocarbons. Most components of gasoline have very low solubility's in water and contain from 4 to 10 carbon atoms. This means that they are volatile and condensable (i.e., liquid at ambient temperatures) to present an ideal situation for the present invention. Since the behavior of the various volatile components of gasoline are similar, they shall be lumped together under the name "gasoline."

It is common for ground water near a leaking tank to contain 100 to 1000 ppmv gasoline. For this example, there shall be a gasoline concentration in ground water of 500 ppmv. The device comprises silicone rubber absorbent material arranged in a tubular array with the tubes comprising a thick film of absorbent material having a thickness of 1 mm, an inner diameter of 1 mm and an outer diameter of 3 mm. The total volume of absorbent material in the device is 0.3 m$^3$ (10 ft$^3$) arranged in three modules. The Concentration Factor (K) is 300 and the Selectivity is 30,000, based on results obtained for toluene.

At equilibrium with the feed, the volume of gasoline absorbed per m$^3$ of absorbent is 0.15 m$^3$. In one full cycle, as depicted in FIG. 6, 0.045 m$^3$ (about 12 gallons) of gasoline is recovered from 90 m$^3$ of water (about 24,000 gallons or 0.045 acre-feet). Based upon a 1.5 hour cycle, the water flow rate is 270 gallons per minute (gpm). This corresponds to treating 1.2 acre-foot of water per day. The power that must be supplied for regeneration is about 5 kW to raise the temperature of saturated absorbent material to 90° C., and 3 kW to evaporate the organics and 4 kW to evaporate some water, and 7 kW for pumping, controls and heat losses, resulting in a power consumption of about 20 kilowatts (kW). At a cost of $0.10 per kW hour (typical remote area electricity cost), the cost of power for this process is about $2.00 per hour or $0.12 per 1000 gallons treated ground water. Steam stripping, by contrast, for the same situation would require an amount of steam equivalent to 10 to 30% of the feed stream. Even if a source of steam was available (from nearby industry) at a typical cost of $2.00 per 1000 lb., the cost of supplying this steam would be from about $2.00/1000 gal to about $5.00/1000 gal.

Example 2

This example illustrates construction of a thick film equilibrium device and process for using the device designed to remove volatile organic components (VOCs) from ground water that has been contaminated through a spill or through previous poor management of hazardous chemicals. In this example, the feed stream is ground water or wash water of the soil that has been pumped to the surface for treatment. The volatile components are halogenated hydrocarbons (e.g., trichloroethylene). Halogenated hydrocarbons have very low solubilities in water. Most halogenated hydrocarbons with fewer than eight carbon atoms are volatile and condensable (i.e., are a liquid at ambient conditions), making them ideal for the present invention. The measured Concentration Factor for trichloroethylene in silicone rubber was used as a typical value for chlorinated hydrocarbons using rubbery polymers.

In a contaminated site, ground water, for example, can contain from 1 to 2000 ppmv VOCs. This example shall be with ground water containing 50 ppmv VOCs. The device comprises crosslinked ethylenepropylene diene rubber as the absorbent material arranged in a flat sheet array with the sheets having a wall thickness of 0.5 mm. The sheets are separated by a spacer material in a plate and frame arrangement. The ground water is pumped to flow through the spacer material on the first side of the filmm absorbent material. The spacer material communicating with the second side of the film absorbent material forms the vapor chamber. The volume of absorbent material is 1 m$^3$ arranged in three modules. The Concentration Factor is 150 and the Selectivity is 15,000.

At equilibrium with the feed stream, the volume of VOCs absorbed per m$^3$ of absorbent is 0.0075 m$^3$. In one full cycle, as depicted in FIG. 6, 0.0075 m$^3$ (about 2 gallons) of VOCs is recovered from 150 m$^3$ of water (about 40,000 gallons or 0.13 acre-feet). Based upon a 1.5 hour cycle, the water flow rate is 440 gallons per minute (gpm). This corresponds to treating 2.0 acre-feet of water per day. The power that must be supplied for regeneration is about 17 kW to raise the temperature of saturated absorbent material to 90° C., and 2 kW to evaporate the organics and some water, and about 11 kW for pumping and heat losses, resulting in a power consumption of about 30 kW. At a cost of $0.10 per kW hour (typical remote area electricity cost), the cost of power for this process is about $3.00 per hour or $0.11 per 1000 gallons treated ground water. A combined air stripping and activated carbon process, by contrast, for the same situation would cost about $2.00/1000 gallons based upon carbon regeneration costs alone.

Example 3

This example illustrates construction of a thick film equilibrium device and process for using the device designed to recover a volatile component from an industrial waste water stream. In this example, the feed stream is waste water from a textile factory containing 2% vinyl acetate and the target is to reduce the vinyl acetate concentration to 0.1% and recover about 95% of the vinyl acetate. At such a low concentration, recovery of vinyl acetate by distillation is not feasible. Vinyl acetate has a solubility of 2% in water and its boiling point is 72° C. The flow rate of the waste water is 20 gpm and the value of recovered vinyl acetate (at the purity it will be recovered) is $100/ton. The absorbent material is silicone rubber, the Concentration Factor is 20 and the Selectivity is 1000.

' The device comprises silicone rubber absorbent material in a thick film arranged in a tubular array with the film having a thickness of 2 mm, an inner diameter of 1 mm and an outer diameter of 5 min. The amount of vinyl acetate recovered per hour is 87 kg (93 liters). At equilibrium with the feed stream (waste water), the amount of vinyl acetate absorbed per m$^3$ of absorbent material is 0.4 m$^3$. Based upon a one hour cycle, about 250 liters (250 kg or 0.25 m$^3$) of absorbent material is required. This can be arranged, for example, in three modules.

Each hour, 100 MJ of energy is required to heat swollen absorbent material to 90° C. and 50 MJ required to evaporate the vinyl acetate. This consumes 42 kW of power. A source of waste heat is probably available in the factory at 95° C. at a cost of $0.03 per kW. Thus, the energy costs for this example are about $1.30 per hour. The power costs of pumping and vacuum are small in comparison. The value of the recovered product is $8.70 per hour. A pervaporation process for this same situation, by contrast, will operate at 80° C. and require 320 kW of power. Even utilizing waste heat, the cost for pervaporation would be $9.60 per hour just to heat the waste water.

Example 4

This example illustrates construction of a thick film equilibrium device and process for using the device to recover a volatile component from an industrial process stream. In this example, the feed stream is mint oil (a mixture of alcohols and terpentenes) containing 1% menthol. Menthol has infinite solubility in mint oil and its boiling point is 212° C., making it just volatile enough for the present invention. The flow rate is 10 gpm. The value of menthol (at the purity it will be recovered) is $5000/ton. For this application, absorption is not practical because the menthol is fully soluble in the feed stream and the formulation of an absorbent material with a sufficiently high Concentration Factor would be too difficult. Instead an adsorbent material is used, polymerized cyclodextrins, which has a strong affinity for menthol. The Concentration Factor is 10 and the Selectivity is 1000.

The adsorbent material in a film is arranged in a spiral module with the curved sheets having a film thickness of 2 mm. Concentric layers of the thick films are separated by spacer materials and arranged as in a standard spiral wound membrane module. The mint oil flows through the spacer material in contact with the first side of the film, and the spacer material on the second side of the film defines the vapor chamber. The amount of menthol recovered per hour is 23 kg (26 liters). At equilibrium with the feed stream, the amount of menthol adsorbed per m$^3$ of adsorbent is 0.1 m$^3$. Based upon a one hour cycle, 260 liters (0.26 m$^3$) of adsorbent material is required. This is arranged in 12 modules (4 for each stage).

Each hour, 200 MJ of energy is required to heat the adsorbent to 90° C. and 50 MJ is required to evaporate the menthol. This consumes 70 kW of power in the form of heat. A heat pump is used to provide this heat, requiring input of 0.25 kW of electrical power for every kW of heat required. The cost of the corresponding 18 kW of electrical energy is about $1.80 per hour. The power costs of pumping and vacuum are small in comparison. The value of recovered menthol is $115 per hour.

Example 5

This example illustrates construction of a thick film equilibrium device and process for using the device designed to recover a volatile component from an industrial process stream. In this example, the feed stream is hexane used for chemical synthesis, and contains 100 ppmv water which must be removed. The flow rate of the contaminated hexane is 10 gpm. The sorbent material used comprises crosslinked polyvinyl alcohol as a binding agent for 2 diameter adsorbent molecular sieve (zeolite) particles. The composite film of adsorbent and absorbent materials is in a tubular form, with a 0.5 mm wall thickness, a 0.25 mm inner diameter and a 1.25 mm outer diameter. The Concentration Factor is 500 and the Selectivity is 10,000.

Water is removed at a rate of 0.23 liters per hour. When there is equilibrium with the feed stream, the capacity of the sorbent is 0.05 m$^3$ (50 liters) of water per m$^3$ of sorbent. Based upon an 8 hour cycle, the amount of sorbent required is 40 liters. This is arranged in three modules. Regeneration is accomplished by recirculating hot nitrogen at 80° C. through the mixture chamber, and pulling a vacuum in the vapor chamber, thus providing heat without oxygen, avoiding the risk of explosion from the hexane. The amount of energy required to heat the sorbent each 8 hours (assuming a 50% thermal efficiency) is 20 MJ, and the evaporation of water requires a further 5 MJ, consuming a total of 900W of power at a cost of $0.09 per hour.

Example 6

This example illustrates construction of a thick film equilibrium device and process for using the device designed to recover a volatile component from a gas phase. In this example, the feed is air from a component washing operation, and the air contains 25 ppm by volume trichloroethylene (TCE). The flow rate of the air (on a dry basis) is 100 cubic feet per minute (0.047 m$^3$/s). The absorbent material used comprises ethylenepropylene diene rubber absorbent material arranged in a flat film array with the films having a thickness of 1 mm. The film has 2 mm high protuberances (fins) on the first side that are about 1 mm thick and spaced about 2 mm apart, as illustrated in FIG. 7, which increases the exposed surface area of the first side of the film. The films are stacked such that the first sides of adjacent films are facing, and the direction of the fins are at an angle such that the film spacing is approximately twice the fin height (i.e., 2×2 mm=4 mm). The second sides of adjacent films are facing and grooves align to form heating chambers, as shown in FIG. 7. The Concentration Factor for a gaseous feed stream is calculated from the volumetric concentration of condensed vapor in the gas, i.e., based on the equivalent volume of liquid TCE present as vapor divided by the volume of air. The Concentration Factor is 400 and the Selectivity is 1,000.

The TCE removal rate is 14 liters of liquid per hour. When in equilibrium with the feed stream concentration, the capacity of the absorbent material for TCE is 0.033 m$^3$ (33 liters) per m$^3$ of absorbent. Based upon a 21 hour cycle, the amount of absorbent required is 430 liters. This can be arranged in three modules. Regeneration is accomplished by recirculating hot ethylene glycol at 120° C. through the heating chamber of the module and by flowing air as a sweep gas through the mixture chamber, which now acts as the vapor chamber. The air flow rate during regeneration is 10 cfm (0.0047 m3/s), thus creating a concentration of TCE in the sweep gas at an average of ten times the TCE concentration in the feed gas. The sweep gas flows through a condenser to allow the TCE to be condensed and recovered. The amount of power required to heat the swollen absorbent material and the sweep gas and to evaporate the TCE is about 20 kW, at a cost of about $0.20 per hour. The value of the recovered TCE (based upon $300/ton) is about $3.00 per hour.

I claim:

1. A method for removing a volatile component from a feed mixture comprising:

(1) absorbing or adsorbing the volatile component of the feed into an absorbent or adsorbent material in an equilibrium process, wherein the feed is pumped through a mixture chamber of a device, wherein the device comprises the mixture chamber and a vapor chamber, wherein the mixture chamber comprises a plurality of films comprising absorbent or adsorbent materials wherein the films are configured to have a first side communicating with the mixture chamber and a second side communicating with the vapor chamber; and (2) removing the volatile component from the absorbent or adsorbent material by discontinuing pumping feed into the mixture chamber and then applying heat to the mixture chamber and simultaneously applying a gas phase within the vapor chamber such that the volatile component is collected in a gaseous state in the vapor chamber.

2. The method for removing the volatile component from the feed according to claim 1, further comprising a step of passing the gas phase from the vapor chamber through a condenser during the removing step and collecting the volatile component as a liquid.

3. The method for removing the volatile component from the feed according to claim 2, further comprising the steps of applying a vacuum to the vapor chamber, and condensing the volatile component into a liquid.

4. The method of claim 1, wherein the step of applying heat to the mixture chamber consists essentially of passing a hot fluid having a temperature of from about 30° C. to about 150° C.

5. The method of claim 4 wherein the temperature of the hot liquid is from about 60° C. to about 100° C.

6. The method of claim 1 wherein the volatile components have a boiling temperature of from about 50° C. to about 220° C. at one atmosphere of pressure.

7. The process of claim 1 wherein the volatile component has a Concentration Factor in the absorbent or adsorbent material of at least 10.

8. The process of claim 7 wherein the volatile component has a Concentration Factor in the absorbent or adsorbent material of at least 100.

9. A device for removing volatile component from a feed comprising an enclosed two-chambered device having a mixture chamber and a vapor chamber, wherein the mixture chamber comprises a plurality of thick films composed of a single layer of absorbent or adsorbent materials configured to have a first side communicating with the mixture chamber and a second side communicating with the vapor chamber, wherein the absorbent or adsorbent materials have a thickness of from about 0.1 mm to 5

10. The device of claim 9 further comprising a condensing means communicating with the vapor chamber to condense a gas phase of a volatile component into a liquid phase.

11. The device of claim 9 further comprising means for applying vacuum to the vapor chamber.

12. The device of claim 9, wherein the thick film is configured as a straight or tortuous tubular array, or as a flat or curved sheet, or is configured with a plurality of protuberances to increase surface area of the first side of the film.

13. The device of claim 9, wherein the absorbent material is composed of any solid material, that absorbs the volatile component.

14. The device of claim 9 wherein the adsorbent material is composed of any solid material, such as a polymeric material, that adsorbs the volatile component.

15. A process for removing a non-volatile organic component from an aqueous feed comprising (1) absorbing or adsorbing the non-volatile component into an absorbent or adsorbent material having a thickness of from 0.1 mm to about 5 mm, in an equilibrium process, wherein feed is pumped through a mixture chamber of a device, wherein the device comprises the mixture chamber and a vapor chamber, wherein the mixture chamber comprises a plurality of absorbent or adsorbent materials dividing the mixture chamber from the vapor chamber and configured to have a first side communicating with the mixture chamber and a second side communicating with the vapor chamber, (2) filling the vapor chamber with a liquid organic solvent and collecting the non-volatile component into the liquid solvent, and (3) removing the liquid solvent containing the non-volatile organic component from the vapor chamber.

16. The process of claim 15 wherein the aqueous feed stream is further contaminated with both a volatile contaminant and a non-volatile contaminant, further comprising removing the volatile component from the absorbent or adsorbent material by applying heat to the mixture chamber and simultaneously applying a gas phase within the vapor chamber such that the volatile component is collected in a gaseous state in the vapor chamber.

* * * * *